Patented July 7, 1931

1,813,632

UNITED STATES PATENT OFFICE

TREADWAY B. MUNROE AND ELBERT C. LATHROP, OF CHICAGO, ILLINOIS; SAID LATHROP ASSIGNOR TO SAID MUNROE

PRESERVATION OF FIBERS

No Drawing.     Application filed May 28, 1927. Serial No. 195,144.

This invention relates to a method of preserving baled bagasse fibers, corn stalk fibers, sorghum fibers, or other fibers suitable for use in the production of pulp, to be used for wallboard manufacture, and has for its object to provide a process which will be certain in action and more economical in use than those heretofore proposed.

With these and other objects in view, the invention consists in the novel steps and combinations of steps constituting the process, all as will be more fully hereinafter disclosed and particularly pointed out in the claims.

A process like that described in U. S. Patent No. 1,572,539 to E. C. Lathrop and T. B. Munroe, dated February 9, 1926, entitled "Preparing and preserving fibers for pulp making purposes" is in use in the art whereby bagasse is baled and piled in such a manner as to take advantage of the fermentation action which is accompanied by heat so that said heating up of the bales and the mass of bales brings about a temperature and a duration of this temperature over a long period of time so that a condition of pasteurization of the internal portion of the masses thus obtained sterilizes the masses, stops fermentation and consequent deterioration of fiber.

It is obvious that the bales on the outside of the mass, piled according to said patent, cannot be heated up to a temperature of pasteurization and further these bales are exposed to precipitation and condensation of moisture so that their moisture content is increased over that at which the bale was originally piled. This increase in moisture content will bring about conditions such that the fiber instead of being sterilized by pasteurization is brought to a higher moisture content and will more rapidly deteriorate than fiber not subjected to such conditions.

In a copending application entitled "Preservation of fibers for pulp making purposes" filed April 5, 1927 Serial No. 181,262, there was disclosed a method of preventing the natural fermentation of the fibers by the addition of certain chemicals to the fibrous mass prior to baling. The purpose of this present invention is to accomplish the preservation of the fibers by treatment which is applicable after the same have been piled for storage purposes. This treatment is not one whereby the fermentations inducing the heating up in the bales and mass of bales is prevented, but the precipitation and condensation of moisture on the bales forming the outside of the mass may not, according to this application, bring about deterioration of the fiber due to distinctive fermentation since the chemicals applied act to prevent the growth of organisms in the bales under these higher moisture conditions.

In order that the precise invention may be more clearly understood it is said: Bagasse fibers, as they leave the sugar mill, contain varying, but small amounts of unextracted sugar together with carbohydrate gums not easily soluble in water. The water content of a mass of raw bagasse is substantially 50%, depending upon the particular actions to which it was subjected prior to leaving the sugar mill. The other mature stalk materials such as sorghum, corn stalks, broom straw and other fibers also contain varying amounts of moisture dependent upon conditions prior to baling, but in general it might be stated that with the usual type of balers now used, the moisture content of such fibers would rarely exceed 70%. If the bagasse were immediately dried after leaving the mill, very little, if any, change in the mass would be subsequently brought about by fermentation action unless moisture is again added in some manner since it is well known that micro-organisms require water in order to grow and carry on their processes of metabolism, known as fermentations. But such drying of bagasse or other stalks is found too costly to be practicable. When masses of bagasse containing moisture, on the other hand, leave the mill and are piled or are baled, alcoholic, acetic acid, lactic acid fermentations begin within a day or a few days thereafter. These said alcoholic and acetic and lactic acid fermentations are confined, however, to a destruction of the sugar content and of the gums present so that substantially no fiber or other real values of the bagasse material are lost by the same.

These said fermentations are also accompanied by the production of heat and by the production of compounds which make more favorable the conditions of growth of other organisms. Of these other organisms there has been found present in the bagasse bacteria, trichaderma, monilia, fusarium, aspergillus, penicilium, mucor, wood-destroying organisms, and mushrooms, such as psilocybe, agaricus, etc. Many of these last named organisms ferment the bagasse in a destructive manner causing a weakening of the fibers or a loss of the fibers or of other valuable constituents of the bagasse.

It has, therefore, been important to find a way of preventing the continued presence of these last mentioned fermentation organisms and to preserve the bagasse from the resulting damage to the end that substantially no values are lost before the fibers are cooked preparatory to making them into the desired heat insulation board.

In the process in the present application, the bagasse or other stalks are baled and piled as described in said U. S. Patent No. 1,572,539 so that heating up and pasteurization of the internal bales and masses of bales is brought about, thus limiting and preventing damage to the fiber of such heated up bales.

In actual commercial practice, the piles of bales assume enormous proportions, it not being uncommon to have 500 tons of dry fiber in one pile or 4,000 bales. These ultimate piles of superimposed layers are made to assume a slightly pyramidal formation, or in other words, the outside bales of any one layer do not extend outward from the pile of bales quite as far as the outer bales of the layers therebelow, thus providing pyramidal, or step formation. By so stacking the baled fibrous mass, it is obvious that there will be a considerable surface of the bales exposed to the weather which will receive moisture by precipitation or condensation so that with the high moisture content of the bales there will come about conditions more favorable for the growth of cellulose destroying organisms. It will further be obvious that these outside bales, including the bales on the bottom of the pile, constitute a relatively large percentage of the total bales in the pile and, therefore, it is desirable to find a means for preventing the destructive fermentation activities and to preserve the fiber in these outside bales in a condition suitable for pulp making purposes. This application is a process for accomplishing this purpose.

It is well known that chemicals have been used for the purpose of preserving certain organic materials and further that chemicals have been used to preserve wood pulp from deterioration during storage. In all such cases, however of which we are aware, chemicals in aqueous solution are sprinkled on the pulp, generally in lap form and these laps are then stored. In this manner, however, the moisture content of the pulp is increased so that increased concentrations of the chemicals must be used to bring about immediate protection, although the pulp is substantially free from soluble food material required for the maintenance of life by the destructive organisms. Because it has been formed into dense sheets or laps, the material is substantially free from air spaces and oxygen, excepting on the outer surfaces of the laps.

With bagasse or other stalks, however, there is ample food material and moisture for the growth of organisms, nor has the product been sterilized by a process of chemical cooking such as is the case with chemical wood pulp. Therefore, conditions of preservation with these stalks and bagasse fibers is more difficult.

By this invention, a substantial stopping of the destructive fermentation on the outside bales and even internally of the pile of bales can be brought about by the application of suitable disinfectant chemicals in a powdered or finely divided form by sprinkling along the contacting bale edges which will be exposed in the pile, as well as on the top surfaces of the exposed bales and on the top of the pile when it is completed, suitable chemicals in dry, powdered form. The quantity of such chemicals required to bring about a preservation of the mass of fibers in the whole pile by this process of pasteurization and outside treatment with chemicals is smaller for any particular chemical than has heretofore been known and indeed is surprisingly small. By this means, the moisture content of the fibrous mass is not increased since the chemicals are added in dry form, and when precipitation of rain or condensation of moisture on the outside bales or tops of the piles takes place, the moisture dissolves the dry chemical and carries it into the bale, maintaining a high degree of concentration so that the growth of micro-organisms is inhibited. That is to say, 250 pounds of the bagasse is compressed into a bale having dimensions approximately 14″ x 18″ x 30″ whereby the bagasse in said bale is under tremendous pressure which precludes the penetration to any appreciable distance of any rainfall or moisture through a vertical surface of said bale, and in fact the compression is sufficiently great so that said moisture will be subsequently dried by sun and wind. Further, several thousand bales are formed into a single pile, some piles having approximate dimensions of 75′ x 120′ and extending to a height of about 35′. The bales are rather closely laid in the bottom and top layers and in the outer sides of the pile, but may be either similarly or random laid inside the pile, whereby small ventilating channels or passages are formed by means of which the air may circulate between the individual bales for drying purposes. In the formation of the outer sides of the pile the bales are preferably stepped, that is the bales of any one course extend outwardly about 2″ beyond the bales of the next superimposed course, thus providing a narrow ledge serving only to receive the dry disinfectant or fungicide which lies as a reservoir, most of said fungicide being laid at the base of a vertical bale side, so that natural moisture may carry said fungicide in solution into the horizontal joint between the bales. Also the sprinkling of the fungicide is made heavier at the adjacent exposed upper edges of the bales. Sometimes, the bales are stacked without the step formation whereby the ledges are not provided, and in this case the fungicide is applied just back of the outside edge of the outside bales of each course as the pile is built up. In either pile formation, the fungicide is carried from its reservoir in between the exposed bales by natural moisture which would be drawn therebetween primarily through capillarity, the moisture dissolving some of the fungicide which will penetrate with the water and coextensively therewith, to the end that the baled fiber wetted thereby will be preserved and therefore will not deteriorate.

It will be obvious that a light rain will carry the chemicals only a short distance into the bale, but that the chemical is not required to go further into the bale than the excess moisture carries it, since the excess moisture is largely responsible for the deterioration of the fiber in the outside bales, the bales being exposed to the weather on the outside during favorable conditions, drying out to a moisture condition below that optimum for the growth of micro-organisms. That is to say, on sunny days the outside bales dry out and it is only the moisture that is added by precipitation of rain or condensation which can bring the bales back to a moisture condition suitable to the growth of micro-organisms. When, however, this precipitation takes place, the dry chemical is dissolved and carried into the bale just so far as the moisture penetrates the bale. If small precipitation, only small penetration—if heavy precipitation, deep penetration. In any case, the chemical poisonous to the micro-organism must accompany the water which makes it possible for the micro-organism to grow.

It is to be noted that the moisture which causes trouble, that is, the destructive fermentations, is substantially only that which enters primarily through capillarity between contacting horizontal faces of adjacent bales. With the stepped pile formation, rain which forms upon the projecting top surface of the bale and that which drains from the face of the superposed bale tends to be drawn back into the pile between the contacting bale faces by the force of capillarity. Even if the lower of two superposed bales does not project, rain draining from the upper bale will likewise tend to be drawn into the pile between contacting bale faces by the forces of capillarity.

Now the water which passes back into the pile between contacting bale faces as described is not subsequently evaporated out by the winds and sun, since the wind and sun cannot act back in the pile as they can on the exposed surfaces, and this moisture which has passed back into the pile remains there and furnishes that moisture necessary for the life processes of the destructive fermentations which have been discussed.

By the application of a dry fungicide along the horizontal contacting bale edges there is provided what might be termed a "reservoir" of such fungicide, which serves as it is dissolved by the water which is precipitated or which collects adjacent said contacting edges, whereby the moisture which enters between the contacting bale faces is charged with fungicide so that its presence within the piled mass is rendered innocuous.

As chemicals suitable for this purpose, it has been found that the alkali, alkali earth metal, copper, zinc or other heavy metal, salts of hydrofluoric acid, fluosilicic acid, borofluoric or boric acid, or these acids themselves may be used. In addition, organic compounds such as sodium dinitrophenolate, beta naphthol and other well known disinfectants are available.

Though it is to be well understood that this invention may be carried out in other ways, one manner in which it may be carried out is as follows:

The fibrous material is baled and the bales are piled, as heretofore disclosed, and during the piling of the bales, the boric acid is sprinkled in a layer over the outside top edge that is, it is sprinkled on the narrow exposed strip of the top surface of each exposed bale at the rate of approximately 4 pounds per ton of bone dry fiber to be contained in the finished pile of approximately 500 tons. Boric acid is then also sprinkled over the top of the top bales. In this manner, each exposed bale receives its definite proportion of chemical in such amounts that upon precipitation of moisture to completely carry the moisture through the exposed part of the bale, the concentration of the chemical dissolved and carried in by the water will be sufficiently high to inhibit the growth of the destroying organisms. It will be understood that the same effect may be produced by sprinkling boric acid on the steps of the pile after all of the bales are placed in position and then treating the top bales, the proportion of boric acid being at the rate above stated.

Thus it will be seen that this mode of treatment is much cheaper than the treatment disclosed in the above copending application where the chemical was applied to the fibrous mass prior to the baling thereof, since in this process only the outside bales need to be treated, the inside bales being protected by a method of pasteurization; further the yield of fiber recovered will be found to be higher.

Thus it will be seen that by this invention there is presented a suprisingly simple process of preventing the natural deterioration for pulp making purposes of a mass of bagasse or other stalk-like material containing sugar and gummy substances, as well as considerable moisture and other food for mircoorganisms, whereby the natural characteristics of the fibers are maintained, which consists in forming the mass of fibers into blades and then creating a pile of these bales in pyramidal or stepped formation with a large exposed surface to which to definite portions as described there is applied a thin layer of a disinfectant compound in powdered form, capable of being carried into the mass in solution by additional moisture from natural causes such as precipitation or condensation whereby fermentation within the mass capable of destroying the fibers will be substantially prevented. A disinfecting compound may be any compound adapted to retard the growth of cellulose or carbohydrate destroying micro-organisms and is preferably a salt of hydrofluoric acid, fluosilicic acid, borofluoric or boric acid, or these acids themselves. Lastly, this compound is used in quantities as little as one-fifth of one per cent by weight of the compound as compared to the weight of the mass of bone dry fiber.

It is obvious that those skilled in the art may vary the process as above outlined without departing from the spirit of the invention above stated and, therefore, it is not desired to be limited to the foregoing disclosure except as may be required by the claims.

What is claimed is:

1. The process of treating fiber producing materials for pulp making purposes which consists in baling said material; stacking said bales to provide a stepped formation in adjacent outer sides of the stack; and applying to the exposed contacting surfaces of contiguous stacked bales a fungicide.

2. The process of treating fiber producing materials for pulp making purposes which consists in baling said material; stacking said bales to provide a stepped formation in adjacent outer sides of the stack; and applying to the exposed contacting surfaces of contiguous stacked bales a disinfecting compound adapted to retard the formation of acetic acid.

3. The process of treating fiber producing materials for pulp making purposes which consists in baling said material; stacking said bales to provide a stepped formation in the outer sides of the stack; and applying to the horizontally exposed surfaces of the stacked bales a dry fungicide adapted to be carried into the baled material in solution upon the addition of moisture to said surfaces.

4. The process of treating fiber producing materials for pulp making purposes which consists in baling said material; stacking said bales to form a pile, the outer bales of the pile arranged in stepped formation; and applying to the exposed horizontal surfaces of the stacked bales in thin layers a finely divided disinfecting compound.

5. The process of treating fiber producing materials for pulp making purposes which consists in baling said material; stacking said bales to form a pile, the outer bales of the pile arranged in stepped formation; and applying to the exposed horizontal surfaces of the stacked bales in thin layers a quantity of a fungicide in the proportion of four pounds per ton bone dry fiber in a pile of 500 tons.

6. The process of treating fiber producing materials for pulp making purposes which consists in compressing said material into bales; forming a pile of said bales with the outer bales closely arranged in courses, each course stepped with relation to a superimposed course to provide a horizontal ledge; and applying to the top surface of the pile as well as to said ledges a total of as little as one-tenth of one per cent by weight powdered boric acid as compared to bone dry fiber in said pile.

7. The process of preserving the natural characteristics of a mass of fiber producing material for pulp making purposes containing moisture against destructive fermentation which consists in forming said mass into bales; so piling said bales as to allow ventilation therebetween while creating in the outer surface of the pile horizontal ledges formed by stacking the outer bales in stepped arrangements; and so applying boric acid to said ledges as to cause the same to be carried into the mass with additional moisture.

8. The process of preserving the natural characteristics of a mass of fiber producing material for pulp making purposes containing moisture against destructive fermentation which consists in forming said mass into bales; so piling said bales as to allow ventilation therebetween and creating relatively narrow horizontal ledges between the courses of the bales on the exterior of the pile; and so applying a quantity of boric acid as little as two pounds per ton of bone dry fiber to said ledges as to cause the same to be carried into the mass with additional moisture caused by precipitation or condensation.

9. The process of preventing the natural deterioration of a mass of fiber producing material for pulp making purposes containing moisture which consists in forming a plurality of bales of said mass into a pile with exposed surfaces; and applying adjacent the exposed contacting edges of the outside bales a non-heat-generating fungicide compound capable of being carried into said mass by additional moisture from natural causes.

10. The process of preventing the natural deterioration of a mass of fiber producing material for pulp making purposes containing moisture which consists in forming a plurality of bales of said mass into a pile with horizontal exposed surfaces in the outer portion of said pile at the joint between the layers thereof; and applying to said surfaces a thin layer of a powdered non-heat-generating fungicide compound capable of being carried into said mass by additional moisture from natural causes.

11. The process of preventing the natural deterioration of bagasse and analogous mass of fiber producing material for pulp making purposes containing moisture which consists in forming a plurality of bales of said mass into a pile in stepped formation with horizontal exposed surfaces; and applying to said surfaces a thin layer of a powdered non-heat-generating fungicide compound as a reservoir adjacent the exposed contacting edges of exterior bales of the pile, said compound available for solution in moisture from natural causes such as precipitation or condensation which may be drawn in between the bales, whereby undue fermentation within the mass from excess moisture will be prevented.

12. The method of storage of bagasse and analogous fiber producing materials for their preservation, comprising baling of the materials, the formation of the bales into a stack, and the application of a fungicide between outwardly exposed contacting edges of adjacent bales.

13. A pile of bagasse or analogous fiber producing material, the pile composed of stacked bales of the material, exterior portions of the stack protected from deterioration, the protecting medium comprising a fungicide applied in dry form between exterior exposed edges of adjacent contacting bales.

14. A pile of fiber producing material, the pile composed of stacked compressed units of such material, the exterior portions of the stack protected from deterioration, the protecting medium comprising a water soluble fungicide applied in dry form between exterior exposed edges of adjacent contacting units, the fungicide when in place comprising a reservoir whereby precipitated moisture penetrating between adjacent contacting faces of the units of material by capillarity will pass through and thereby become charged with the fungicide material.

15. The method of preventing destructive fermentations of fibrous vegetative materials in storage wherein the initial moisture content of the material compressed into relatively dense bales is lowered below the optimum for destructive fermentations through evaporation caused by heat generated by non-destructive fermentations in the material while arranged in huge mass, the mass after the initial evaporation protected from the deleterious effects of subsequently externally acquired moisture through the provision of reservoirs of soluble fermentation inhibiting substances plannedly so placed that moisture tending to appreciable penetration into the body of the mass dissolves from and becomes charged with the inhibiting substances of the reservoirs of fermentation inhibiting substances.

In testimony whereof we affix our signatures.

TREADWAY B. MUNROE.
ELBERT C. LATHROP.